US008549064B2

(12) United States Patent
Kamalakantha et al.

(10) Patent No.: US 8,549,064 B2
(45) Date of Patent: Oct. 1, 2013

(54) SYSTEM AND METHOD FOR DATA MANAGEMENT

(75) Inventors: Chandra H. Kamalakantha, Plano, TX (US); Srivats Rayaplolu, Plano, TX (US); Sridhara Madhugiri, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 643 days.

(21) Appl. No.: 12/190,484

(22) Filed: Aug. 12, 2008

(65) Prior Publication Data

US 2010/0042641 A1   Feb. 18, 2010

(51) Int. Cl.
 *G06F 17/30* (2006.01)
(52) U.S. Cl.
 USPC .......................................... 709/203; 709/232
(58) Field of Classification Search
 USPC ................................................. 709/203, 232
 See application file for complete search history.

(56) References Cited

U.S. PATENT DOCUMENTS

| | | | | |
|---|---|---|---|---|
| 6,076,111 | A  * | 6/2000 | Chiu et al. | 709/232 |
| 6,832,229 | B2 * | 12/2004 | Reed | 1/1 |
| 7,158,990 | B1 * | 1/2007 | Guo et al. | 1/1 |
| 7,409,461 | B2 * | 8/2008 | Sundarraj et al. | 709/242 |
| 2005/0223109 | A1 * | 10/2005 | Mamou et al. | 709/232 |
| 2005/0262192 | A1 * | 11/2005 | Mamou et al. | 709/203 |
| 2005/0262194 | A1 * | 11/2005 | Mamou et al. | 709/203 |
| 2006/0069717 | A1 * | 3/2006 | Mamou et al. | 709/203 |

* cited by examiner

*Primary Examiner* — Kim Nguyen

(57) ABSTRACT

A data processing system that includes a processor and a metadata repository storing data describing a plurality of systems and applications. The data processing system also includes integration rules describing a plurality of data distribution formats corresponding to the plurality of systems. The data processing system correlates data between the metadata repository and the integration rules to produce and store an impact analysis of the effect a change would have on the plurality of systems and applications. There is also a master data management system including a metadata repository and integration rules. The master data management system correlates data between the metadata repository and the integration rules to produce and store an impact analysis of the effect a change would have on the plurality of target systems and applications. The master data management system is configured to publish data to the plurality of target systems over a network.

18 Claims, 8 Drawing Sheets

SYSTEM AND METHOD FOR DATA MANAGEMENT

TECHNICAL FIELD

The present disclosure is directed, in general, to data management and analysis.

BACKGROUND OF THE DISCLOSURE

Current data management techniques are not comprehensive, and are not easily analyzed to determine the consequences to making changes in certain data or formats. In addition, the orchestrator that mediates data proliferation is not robust and involves extensive coding to subscribe to data services for consumption and processing.

SUMMARY OF THE DISCLOSURE

According to at least one disclosed embodiment, there is a data processing system that includes a processor and a metadata repository storing data describing a plurality of systems and applications. The data processing system also includes integration rules describing a plurality of data distribution formats corresponding to the plurality of systems. The data processing system correlates data between the metadata repository and the integration rules to produce and store an impact analysis of the effect a change would have on the plurality of systems and applications.

At least one other disclosed embodiment includes a master data management system including a plurality of system data processing systems configured to together implement a metadata repository storing data describing a plurality of systems and applications. The system data processing system are also configured to implement integration rules describing a plurality of data distribution formats corresponding to the plurality of target systems. The master data management system correlates data between the metadata repository and the integration rules to produce and store an impact analysis of the effect a change would have on the plurality of target systems and applications. The master data management system is configured to publish data to the plurality of target systems over a network.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
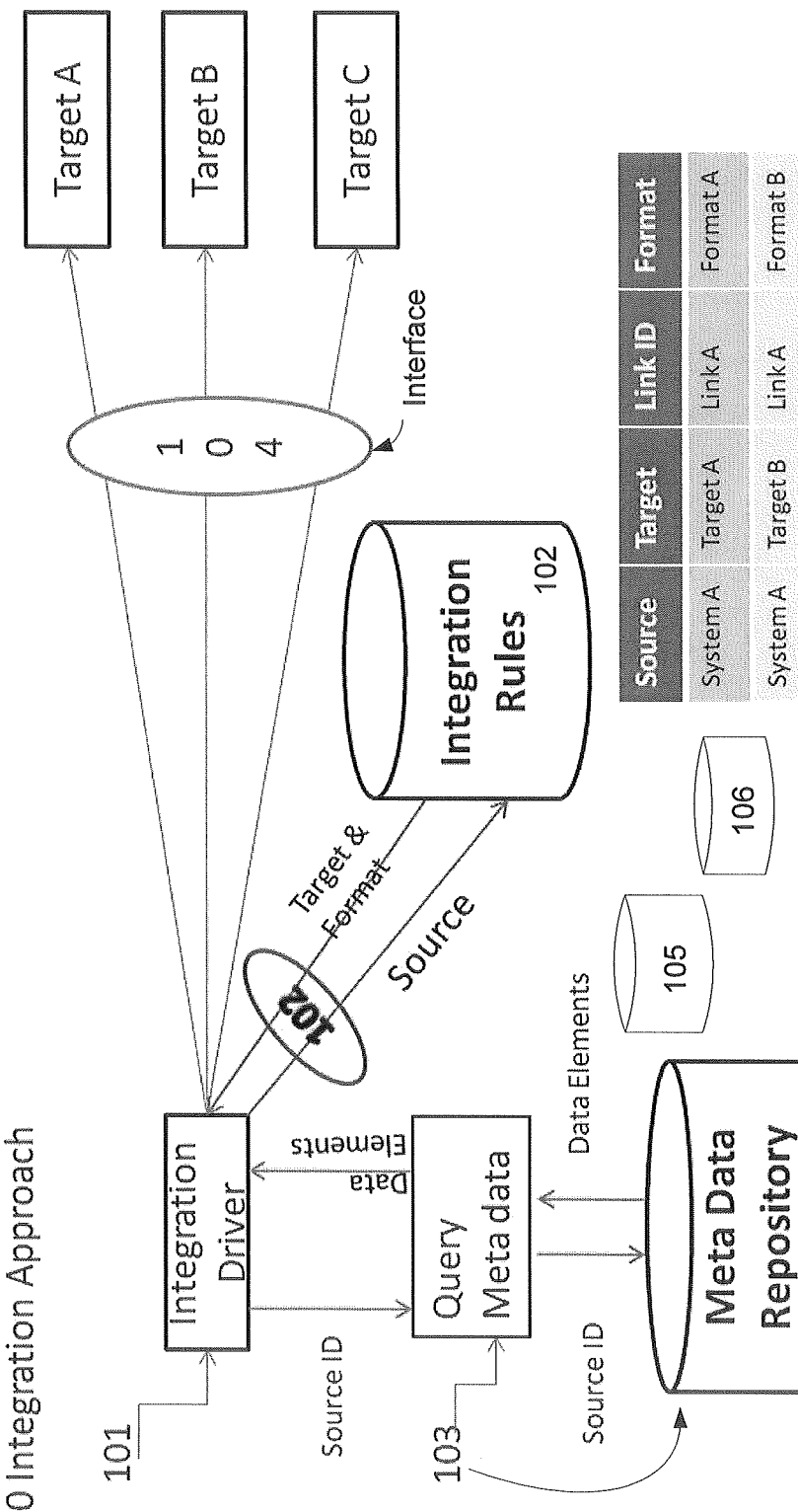
FIG. 1 depicts an Integration Approach for Master Data Management (MDM), in accordance with a disclosed embodiment.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

There is a growing trend in market on establishing unified data stores. To this end, there are numerous companies who have specialized master data management (MDM) solutions varying from operational database centric to data warehouse centric solutions.

Various disclosed embodiments, unlike current systems, provide a facility to perform impact analysis using canonical organization and its attributes, support just one enterprise wide canonical for given entity (example: product, supplier, etc.), provide a facility for meta data management with special emphasis on subscribers, and proliferate data using a single publisher using single enterprise wide canonical with selective intelligent subscribers.

Various disclosed embodiments also offer data-driven rule-based subscriptions along with plug-n-play architecture.

MDM revolves around robustness of metadata and all the data elements, i.e., data dictionary. Typically, the data dictionary is maintained outside of MDM solution in external repositories. Over time, the data validity between the external repository and MDM solution breaks for various reasons, including cost of maintaining in more than one place. The stale data that is in external repository makes it difficult, in current systems, to perform impact analysis, e.g., what systems would be impacted if a proposed change is made, such as increasing length of UPC field or product field to implement Global Trading Identifier.

Adding a new subscriber to subscribe to an enterprise wide canonical publication creates additional burden of coding an interface with transformation, and mapping (interface mapping) is an expensive coding exercise. Current systems provide no facility to perform impact analysis and do not allow a facility to keep the data elements synchronized between MDM and the data dictionary repository. Maintaining a common enterprise-wide canonical makes the reuse of information an expensive coding exercise with no reuse and often leads to point-to-point interfaces.

Data integration is a weak link of current solutions. MDM is not a data consolidation and propagation exercise, but should perform the task completely. The disclosed embodiments provide a capability to perform impact analysis and provide a feature to subscribe to new integrations with data driven approach instead of coding and cut the development time while supporting an enterprise wide canonical strategy.

Various disclosed embodiments provide a mechanism that allows one to adopt the prescribed approach to any integration middleware and is language neutral. The disclosed embodiments exploit management and organization of metadata to allow data propagation in real time and batch manner. The metadata management approach offers a new way of performing impact analysis and a mechanism to publish data to interested subscribing systems. One advantageous aspect of this approach is it allows one to adapt to enterprise canonical document, adding of new subscribers as a data entry exercise and finally can adopt any industry data model such as Association for Retail Technology Standards (ARTS), etc. All the data output or processed herein, unless described differently, is output, transmitted, stored, and/or displayed in various embodiments.

FIG. 1 depicts an Integration Approach 100 for Master Data Management (MDM), in accordance with a disclosed embodiment. This module provides overall design utilized for an MDM solution. The design approach utilizes SOA (Service Oriented Architecture) principles to implement the solution. The core areas of the design include metadata necessary to manage master data, integration rules, master data, and a data layer and service layer to manage metadata, master data and integration rules. One could externalize the rules to be kept in rules engine and the described approach can support such an approach In any of the embodiments disclosed herein, the various components can be co-located, implemented on a single data processing system, or can be distributed over multiple data processing systems connected to operate as described. In particular, where a user interface is described, or a user is described as interacting with a system, this interaction may take place over a network, where the user interface is presented to the user at a location remote from other components of the described data processing system. For example, the user interface may be presented in a browser on a client data processing system connected over a network, and any output can be displayed in the browser over the network.

Metadata, Integration Rules and Master data reference is organized under three core tables:

MDM_Data_Elements (Refers to all master data table and its elements)

MDM_Reference_Tables (Reference to all master data tables)

MDM_Integration_Rules (Refers to how data is shared between source and target systems)

The web services layer will exposes CRUD (Create, Read, Update, and Delete) operations on the above tables and master data tables. The web services layer is a thin wrapper on the data services layer.

Integration driver 101 interacts with integration rules 102 (also referred to as a rules repository) to retrieve integration rules, with metadata repository 103 to query retrieve metadata, and with targets A/B/C through interface 104 to publish the data utilizing publish-subscribe mode. Input for the integration driver 101 could be SourceID or empty. The interface could be triggered on scheduled basis or invoked as a web service (asynchronous or synchronous).

Integration driver 101 links metadata, rules data, and transforms the source data accordingly into the required format for target systems. It also facilitates intelligent routing, provides web services to interact with source systems for real-time data transformation and also to perform data maintenance (CRUD) in the repository with access control lists.

Rules repository 102 can be queried with a source and links as the input and it delivers the target and distribution format as the response. Rules repository 102 can be invoked by integration driver 101 to retrieve target systems interested in particular master data area along with the format in which the information is exchanged.

The integration rules repository 102 maintains the source and target systems information and their data distribution format. It also maintains the links between the metadata and rules.

Metadata repository 103 can be queried to retrieve the data elements and transformation logic required to transform data from source system to target system. This interface will be invoked by integration driver 101 to retrieve the data elements and transformation logic.

The transactions flowing thru the system are archived in the transactional history tables aka archive table. The "Archive tables" are used for retransmission of data and also facilitates publishing the changed data only once to the subscriber.

Interface 104 is responsible for transforming the data based on target system format and routing the data to target system in preferred format and data transmission scheme. Example formats could be comma delimited, pipe delimited, fixed length, etc. Example transmission scheme could be FTP, HTTP, Email, or Message.

Interface 104 utilizes a publish-subscribe model and will provide generic subscribers for JDBC (Java database connectivity), Flat file, and JMS (Java Messaging Service) to enable data driven integration approach.

History repository 105 maintains the history of transactions and is utilized while resubmitting failed transactions to the target systems. Archive repository 106 maintains all the master data elements and its archive tables.

Other elements, not shown, can also be used to expose web services that provide CRUD database operations on master data tables.

Figure 2:
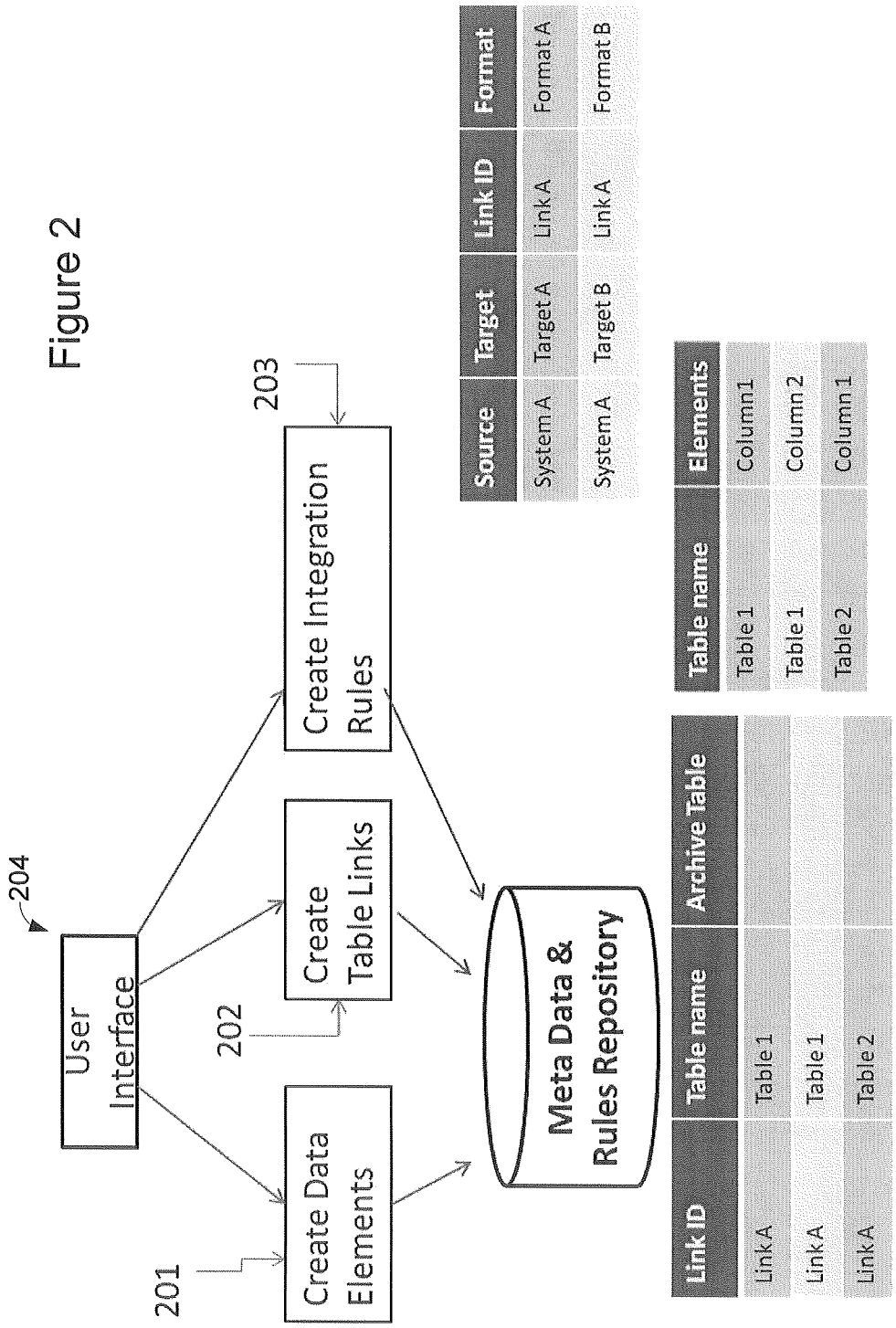
FIG. 2 depicts a Metadata Management Approach in accordance with a disclosed embodiment.

FIG. 2 depicts a Metadata Management Approach (Administrator UI) 200 in accordance with a disclosed embodiment.

The administrator users are provided with Graphical User Interface (GUI) 204 to maintain the metadata and integration rules. The metadata and integration rules are represented as set of tables that are related and reside in a Relational Data Management System [RDBMS]. Administrators use the Graphical User Interface (GUI) 204 to maintain the metadata (data about data) and also integration rules.

Create data elements module 201 provides a set of screens and interfaces, such as web services wrappers on a data layer, to perform CRUD operations on metadata related to various source and target system tables and their elements, etc.

Create table links module 202 provides a set of screens and interfaces, such as web services wrappers on a data layer, to perform CRUD operations on metadata related to base tables, archive tables and their links, etc.

Create integration rules module 203 provides a set of screens and interfaces, such as web services wrappers on a data layer, to perform CRUD operations on metadata related to integration rules which comprise of target system information, data distribution formats, etc.

Figure 3:
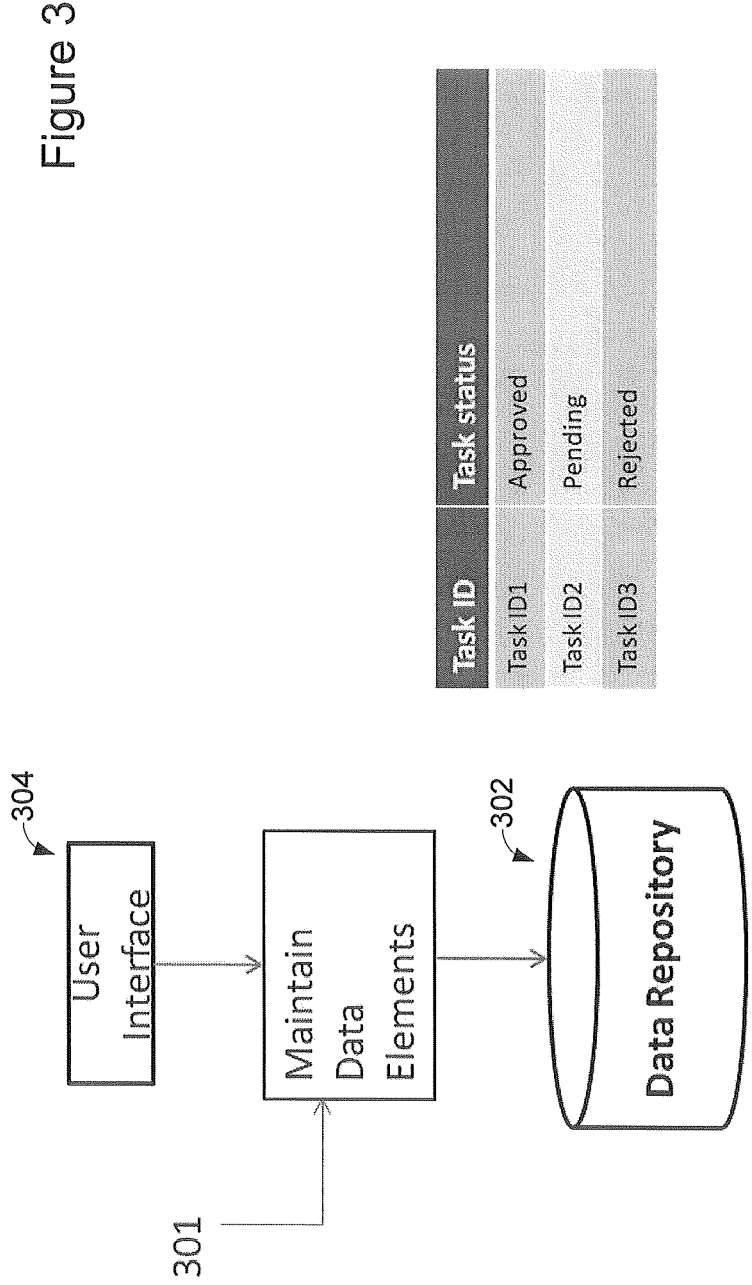
FIG. 3 depicts a Master Data Management Approach in accordance with a disclosed embodiment.

FIG. 3 depicts a Master Data Management Approach (End User UI) 300 in accordance with a disclosed embodiment.

The end users will be provided with Graphical User Interface (GUI) 304 to maintain the master data. The master data is represented as set of tables that are related and reside in a Relational Data Management System (RDBMS). The GUI systems strictly enforce all the Business Rules (BR), and the end-to-end Business Processes (BP) with workflow to fulfill the effective data management strategy. The UI design utilizes the industry best standards for caching, tiered approach, exception handling, authorization, authentication, etc.

Maintain data elements module 301 is set of screens that will allow user to query, add, delete and modify the master data in data repository 302 related to particular domains such as Product, Supplier, Customer, etc. The GUI system uses the web service that is exposed out of the middleware platform (e.g., as depicted in Integration Approach 100) for maintaining master data, i.e., CRUD to control and restrict data manipulation to one platform.

The data model behind Master Data supports plug-n-play and rip-and-replace architecture and is not confined to any specific model. The modifiers associated with the adopted data model are just three attributes to track the workflow and audit trail only on master tables. Additional tables can augment the data model as described under Integration Approach 100 and Metadata management approach 200.

In some embodiments, Integration Rules and Metadata Repository can be hosted on the same RDBMS. They are described separately for the sake of clarity.

Figure 4:
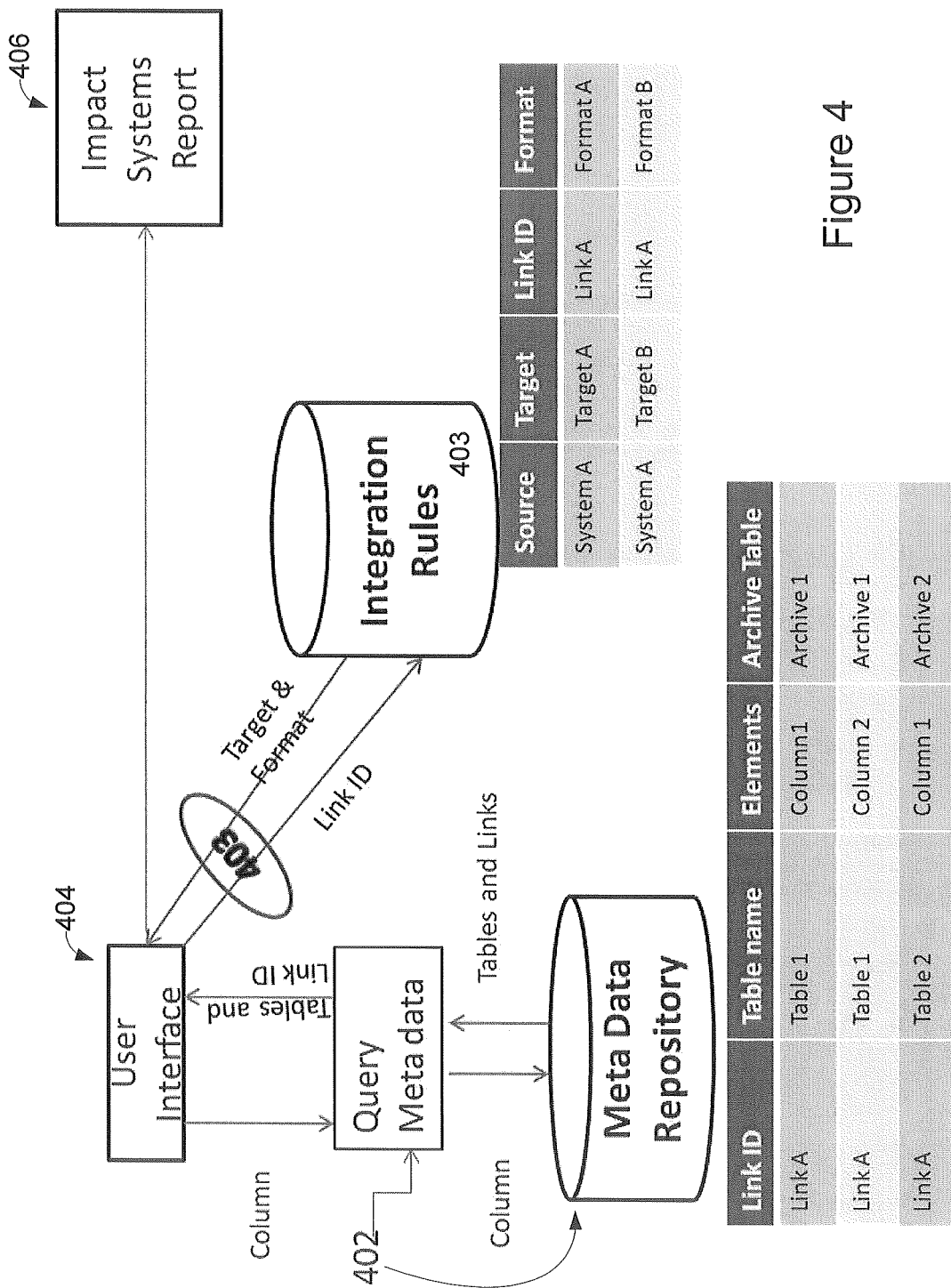
FIG. 4 depicts an Impact Analysis Approach in accordance with a disclosed embodiment.

FIG. 4 depicts an Impact Analysis Approach 400 in accordance with a disclosed embodiment. The end users are provided with Graphical User Interface (GUI) 404 to perform impact analysis. The Metadata behind master data is represented as set of tables that are related and reside in RDBMS. A Metadata dictionary is a significant part of some embodiments.

The GUI 404 provides a mechanism to perform impact analysis by data element, which could be data base column name or the data element description not shown in sample data model, in the data model described with regard to FIGS. 1 and 2, and creates a formatted query that depicts the impacted systems along with the format that is used for data synchronization. GUI 404 can be used to query metadata repository 402. Metadata repository 402 works in conjunction with integration rules 403 to produce the results required for the impact systems report 406. Various records in metadata repository 402 and integration rules 403 are associated with a link-id that can be cross-correlated.

The GUI 404 provides a mechanism to perform impact analysis by data element as depicted in the data model described with regard to FIGS. 1 and 2. Integration rules 403 works in conjunction with metadata repository 402. The link-id is extracted out of a query that is performed in on the metadata repository 402 and is correlated by link-id to extract affected systems and the format of data. The system therefore correlates data between the metadata repository and the integration rules to produce an impact analysis of the effect a change would have on the plurality of systems and applications, and outputs that analysis by displaying, storing, and/or transmitting it.

Integration Rules 403 and Metadata Repository 402 are, in some embodiments, hosted on the same RDBMS, and called out here as separate for the sake of clarity.

Figure 5:
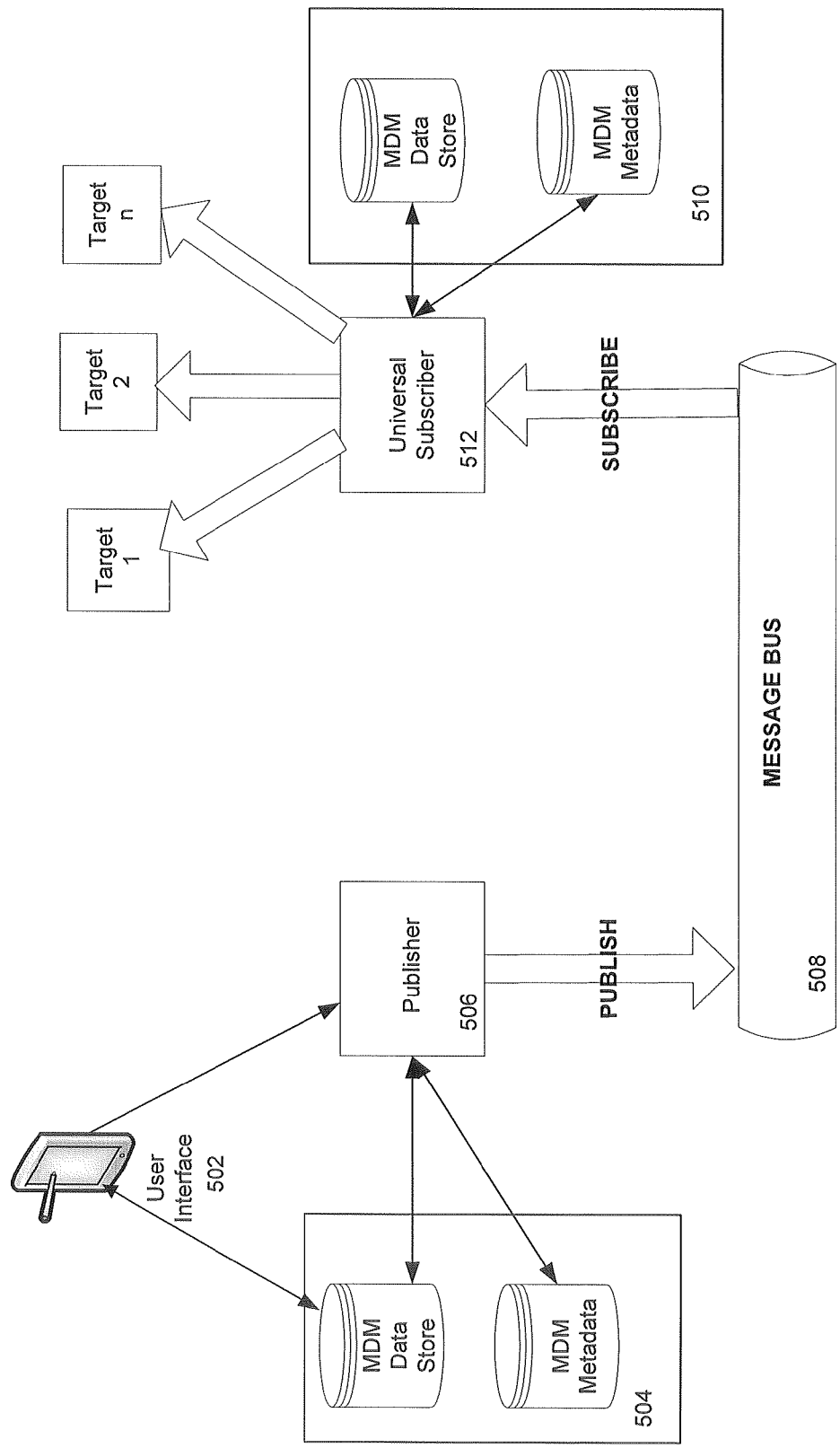
FIG. 5 depicts a block diagram for illustrating processes in accordance with a disclosed embodiment.
Figure 6:
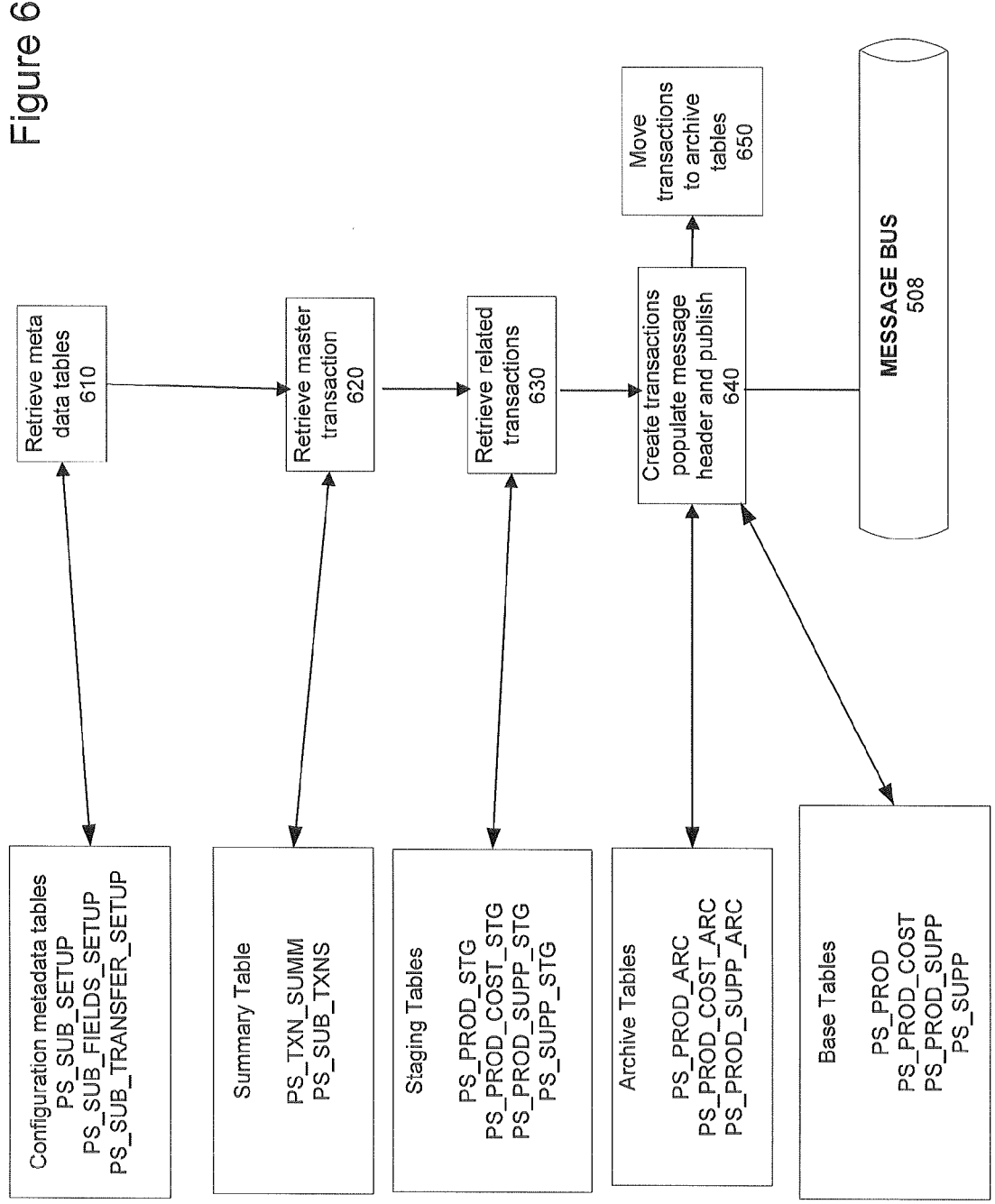
FIG. 6 depicts a flowchart of a process in accordance with a disclosed embodiment.

FIG. 5 depicts a block diagram for illustrating processes in accordance with a disclosed embodiment, and FIG. 6 depicts a flowchart of a process in accordance with a disclosed embodiment.

Before publishing data, the system iterates the metadata dictionary in datastore 504 (e.g., Tables 1, 2, 3 described below) and extracts all subscribers (e.g., target systems 1, 2, 3) that could be interested in the transaction along with the respective data elements and mapping, as shown at block 610. For example: Target system n may be interested in changes to MDM product's retail price where as Target system 2 could be interested in changes to any and/or all MDM product attribute, Target system 1 could be interested in changes to MDM product's supplier change, etc.

The system then iterates the metadata dictionary in datastore 504 (e.g., Table 4 described below) and extracts list of transactions key elements in order to build out master transactions and its details, as shown in block 620.

The system populates the MDM staging tables and retrieves related transactions by performing a table difference operation of MDM base tables and MDM archive tables in datastore 504, as shown in block 630. In some embodiments, this step utilizes contents of tables 4 and 5 described below to iterate the related tables in order to construct detail elements of the transaction detail The system extracts data out of MDM staging tables in datastore 504 (Using, e.g., tables 3 and 4 and output of the previous process) to publish transactions to message bus 508 using publisher module 506, as shown in block 640. The message header indicates the possible subscribers for intelligent routing and control area has the actual transaction details.

Once the transactions are successfully published to message bus 508, the transactional data is moved from MDM staging tables to MDM archive tables for archival purposes (which could be used for retransmissions, error handling, audit control, etc.), as shown in block 650. This step utilizes tables 3 and 4 contents to decipher MDM staging and archive tables.

The published transactions can be delivered to universal subscriber 512 to be used by targets 1 . . . n. The published transactions can be stored in datastore 510.

Figure 7:
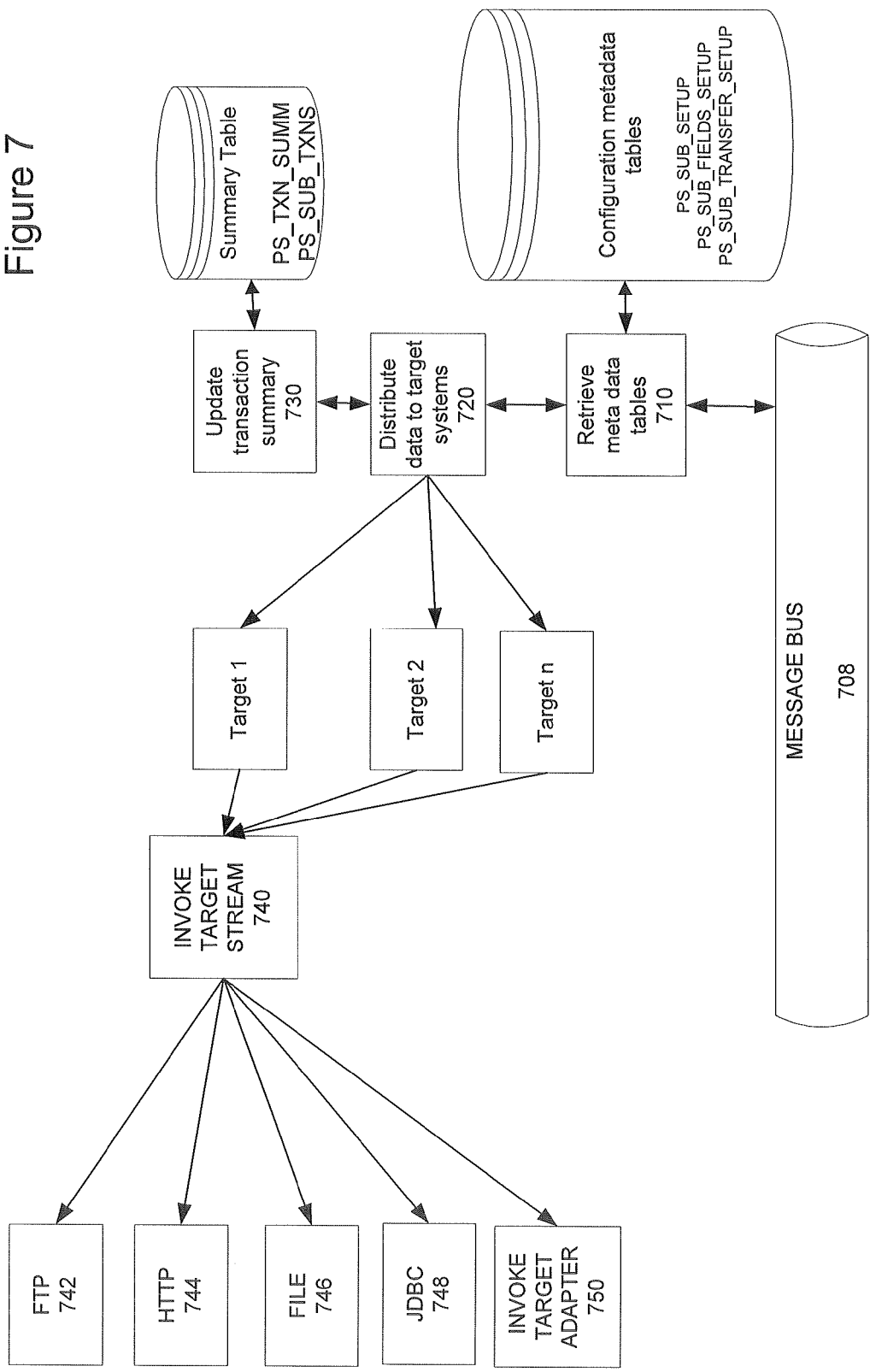
FIG. 7 depicts a flowchart of a process in accordance with a disclosed embodiment.

FIG. 7 depicts a flowchart of a process in accordance with a disclosed embodiment.

Various embodiments call for a generic/universal subscriber and allows options to add additional subscribers since it uses publish/subscribe mechanism. If one chooses to write a new subscriber they can use the subscription rules mechanism to poke message header attribute and fire the subscriber process or ignore. Note that in some embodiments, the message header indicates interested subscriber. The system provides a generic subscriber for data syndication by reading a message from the message bus 708 and retrieves metadata attributes to decipher subscriber information such as format, transport, etc. and invoke a target stream as shown at block 740.

The system provides a generic subscriber for data syndication by retrieving metadata tables, as shown at block 710, and distributing them to target systems, as shown at block 720. Target streams can include FTP 742, HTTP 744, file 746, JDBC 748, and other application adapters known to those of skill in the art. The system transforms canonical document from source to destination by utilizing transformation and syndication rules as defined in table 3, described herein. The system provides generic adapter capabilities and invokes the target adapter(s) as shown at block 750.

The system also tracks data syndication status and keeps audit trails of data syndication between source and targets, as shown at block 730. The system can be configured for purging transactions as appropriate. This process, in some embodiments, uses tables 3 and 4 contents to decipher MDM staging and archive tables.

Various disclosed embodiments provide a flexible solution that can be implemented for either custom or commercial off-the-shelf (COTS) application data syndication, and provide the capability to perform impact analysis.

Various embodiments enforce enterprise wide canonical with a single publisher, and adds intelligent data, e.g., message header marks, to interested target systems to enable subscribers to use pre-processing rules to fire the actual subscription.

The disclosed processes can be applied for both real-time, near real-time and bulk data syndication, and provide a universal subscriber with varying data mappings (format) and transport schemes. The various embodiments provide capabilities to synchronize specific transactions thru archival and staging tables.

An exemplary Table 1 (Pub_stub_setup) for MDM subscribers is shown below.

| Column Name | Type | Comments |
| --- | --- | --- |
| Subscriber_Id | Number | Sequence generated number given to each subscriber interface |
| Subscriber_Name | Varchar2(10) | Meaningful name of subscriber interface |
| Description | Varchar2(100) | Description of subscriber |
| Active_Flag | Varchar2(1) | Active status of subscriber |

An exemplary Table 2 (Pub_sub_field_setup) for MDM subscriber fields is shown below.

| Column Name | Type | Comments |
| --- | --- | --- |
| Subscriber_Id | Number | Sequence generated number given to each subscriber interface |
| Table_Name | Varchar2(50) | Table name from where subscriber is getting data from |
| Column_Name | Varchar2(50) | Column name of given table that is included in the feed to subscriber |
| Description | Varchar2(100) | Description of subscriber |

An alternate table for MDM subscriber fields is shown below.

| Column Name | Column Type | Comments |
| --- | --- | --- |
| Subscriber_Id | Number | Sequence generated number given to each subscriber interface |
| Table_Name | Varchar2(50) | Table name from where subscriber receives a given field |
| Column_Name | Varchar2(50) | Column name of given table for the subscriber id. |
| Description | Varchar2(100) | Description of subscriber |
| Tab_Level | Varchar(1) | Check level of transaction, at Vendor-Site level or below |
| Active_Flag | Varchar2(1) | Active status of subscriber |
| If_Null_Value | Varchar2(20) | If either archive or out table columns have null values than instead of null use 'If_Null_Value' value. For date data type use '31-Dec-4712', for number data type use '−1' and for varchar data type use '~'. |

An exemplary Table 3 (Pub_sub_transfer_setup) for MDM transfers is shown below.

| Column Name | Type | Comments |
| --- | --- | --- |
| Subscriber_Id | Number | Sequence generated number given to each subscriber interface |
| Transfer_Method | Varchar2 | Data syndication method [stream, adapter, etc.] |
| Transfer_Format | Varchar2 | Data syndication format [csv, fixed length, etc.] |

An exemplary Table 4 (Pub_sub_Txn) for MDM subscriber transactions is shown below.

| Column Name | Type | Comments |
| --- | --- | --- |
| Run_Id | Number | Auto generated sequence number to depict last data syndication |
| Run_Date | Date | Auto generated sequence number to depict last data syndication date/time |
| Subscriber_Id | Number | Sequence generated number given to each subscriber interface |
| Master_table_tags | Number | Correlation Id to master table reference keys |

An alternate table for MDM subscriber transactions is shown below.

| Column Name | Type | Comments |
| --- | --- | --- |
| Run_Id | Number | Sequence generated, unique number assigned to each interface at each run. |
| Run_Date | Date | Date for given run id. |
| Subscriber_Id | Number | Sequence generated number given to each subscriber interface. |
| Master_data_Id | Number | Master data id for the given subscriber id who consumes the data. |

An exemplary Table 5 (Pub_sub_Txn_Summ) for MDM subscriber transaction summaries is shown below.

| Column Name | Type | Comments |
| --- | --- | --- |
| Run_Id | Number | Auto generated sequence number to depict last data syndication |

-continued

| Column Name | Type | Comments |
|---|---|---|
| Run_Date | Date | Auto generated sequence number to depict last data syndication date/time |
| Subscriber_Id | Number | Sequence generated number given to each subscriber interface |
| Process_Status | Number | Assigned status number that describes process level |
| Extract_Complete_Flag | Varchar2(1) | Flag to determine extract process completion |
| Extract_Process_Msg | Varchar2(200) | Detail message for process completion |

An exemplary table for MDM subscriber subtransactions is shown below.

| Column Name | Type | Comments |
|---|---|---|
| Run_Id | Number | Sequence generated, unique number assigned to each interface at each run. |
| Run_Date | Date | Date for given run id. |
| Subscriber_Id | Number | Sequence generated number given to each subscriber interface |
| Master_data_Id | Number | Master data id for the given subscriber id who consumes the data. |
| Sub_Key_ID | Number | PK of sub transaction level tables that have a relationship with master ID table |
| Table_Name | Varchar2(50) | Table name at sub transaction level |

All change transactions will be processed to determine which subscribers have access to it. Dynamic select SQL will be developed from subscriber set up and the subscriber fields set up table to compare each field of each subscriber against changed transactions records. This process will update subscriber transactions table with the subscriber id and primary keys of all main tables.

An Interface Summary Table as shown below can maintain communication track between MDM database and webMethods.

| Column Name | Type | Comments |
|---|---|---|
| Run_Id | Number | Sequence generated, unique number assigned to each interface at each run. |
| Interface_Name | Varchar2(20) | Short logical name of interface |
| Run_Date | Date | Date for given run id. |
| Process_Status | Number | Assigned status number that describes process level |
| Extract_Complete_Flag | Varchar2(1) | Flag to determine extract process completion |
| Extract_Process_Message | Varchar2(2000) | Detail message for process completion |
| Int_Complete_Flag | Varchar2(1) | Integration server read out table process completion flag |
| Int_Process_Completed | Date | Integration server read out table process completion date |
| Int_Process_Message | Varchar2(2000) | Detail message of Integration server read out table process completion |
| Arc_Complete_Flag | Varchar2(1) | Integration server archive out table process completion flag |
| Arc_Process_Completed | Date | Integration server archived data and the archived data was |
| Arc_Process_Message | Varchar2(2000) | Details of Integration server archiving data i.e., final status of archive process |

The following describes an exemplary scenario that uses an MDM system and method in accordance with disclosed embodiments. The sample scenario chosen for this use case demonstration is an implementation of the disclosed MDM system for product management.

MDM system in its simplest form uses three master data tables for MDM Product (Create Data Elements)

Product

Product_Supplier

Product_Control

Product

| Column Name | Column Type |
|---|---|
| Product_Id | Number |
| Product_Description | Varchar(50) |

Product_Supplier

| Column Name | Column Type |
|---|---|
| Product_Id | Number |
| Supplier_Id | Number |

Product Control

| Column Name | Column Type |
|---|---|
| Product_Id | Number |
| Supplier_Id | Number |
| Suggested_Retail_Price | Number |
| Cost | Number |

The system creates table links, the metadata for the master data:

MDM_Data_Elements

| LinkID | TableName | ArchiveTableName |
|---|---|---|
| Inventory_Mgmt_Link | Product | Arhive_Product_INV |
| Pricing_Link | Product | Archive_Product_PRICE |
| Pricing_Link | Product_Control | Archive_Product_Control_PRICE |
| Data_Warehouse_Link | Product | Archive_Product_DW |
| Data_Warehouse_Link | Product_Supplier | Arhive_Product_Supplier_DW |

The system creates Integration Rules (Metadata for integration rules):

MDM_Integration_Rules

| Source System | Target System | LinkID | Format |
|---|---|---|---|
| MDM Product | Inventory_Mgmt | Inventory_Mgmt_Link | CSV |
| MDM Product | Pricing | Pricing_Link | HTTPS |
| MDM Product | Data_Warehouse | Pricing_Link | DB |

The system provides an Integration Driver Input, Source_ID="MDM Product", in Real time.

| Target System | LinkID | Format |
|---|---|---|
| Inventory_Mgmt | Inventory_Mgmt_Link | CSV |
| Pricing | Pricing_Link | HTTPS, Pipe delimited |
| Data_Warehouse | Pricing_Link | DB Replicate |

For simplicity, in this example, the database replication is a replication of data and data definitions:

| TableName | Column |
|---|---|
| Product | Product_Id |
| Product | Product_Description |
| Product_Supplier | Product_Id |
| Product_Supplier | Supplier_Id |
| Product_Control | Product_Id |
| Product_Control | Supplier_Id |
| Product_Control | Suggested_Retail_Price |
| Product_Control | Cost |

The output to the target systems, as described above, in this example is as follows:

Target System: Inventory_Mgmt; Format CSV file
Product_Id, Product_Description
Target System: Pricing; Format HTTPS stream (post of data as payload over secure stream)
Product_Id|Product_Description|Supplier_id|Suggested_Retail_Price|Cost
Target System: DataWarehouse; DB Replicate
The following tables show the exemplary output:
Product

| Column Name | Column Value |
|---|---|
| Product_Id | 12345 |
| Product_Description | IP Phone |

Product_Supplier

| Column Name | Column Value |
|---|---|
| Product_Id | 12345 |
| Supplier_Id | 10001 |

Following is sample XSD code as could be used in a system in accordance with a disclosed embodiment:

```xml
<?xml version="1.0" ?>
-<PROCESS_PROD_MAIN>
 -<CNTROLAREA>
  -<BSR>
   <VERB value="PROCESS">PROCESS</VERB>
   <NOUN value="PROD">PROD</NOUN>
   <REVISION value="001">1</REVISION>
  </BSR>
  -<HEADER>
   <OPERATION>ADD</OPERATION>
   <SOURCE>009876545</SOURCE>
   <TARGET>001234567</TARGET>
   <COMPONENT>PRODUCTDATA</COMPONENT>
   <TASK>PRODUCTPUBLISH</TASK>
   <REFERENCEID>event:708327-710602</REFERENCEID>
   <CONFIRMATION>0</CONFIRMATION>
   <LANGUAGE>US</LANGUAGE>
   <CODEPAGE>WE8ISO8859P1</CODEPAGE>
   <AUTHID>SCM</AUTHID>
   <TRANSACTIONID>10001</TRANSACTIONID>
   <CONVERSTATIONID>1000001</CONVERSTATIONID>
  </HEADER>
  -<DATETIME qualifier="CREATION" type="T" index="1">
   <YEAR>2008</YEAR>
   <MONTH>05</MONTH>
   <DAY>29</DAY>
   <HOUR>14</HOUR>
   <MINUTE>28</MINUTE>
   <SECOND>39</SECOND>
   <SUBSECOND>0000</SUBSECOND>
   <TIMEZONE>+0000</TIMEZONE>
  </DATETIME>
 </CNTROLAREA>
 -<DATAAREA>
 -<PROCESS_PROD>
 -<PROCESS_PROD_HDR>
 -<DATETIME qualifier="CREATION" type="T" index="1">
   <YEAR>2008</YEAR>
   <MONTH>05</MONTH>
   <DAY>29</DAY>
   <HOUR>14</HOUR>
   <MINUTE>28</MINUTE>
   <SECOND>39</SECOND>
   <SUBSECOND>0000</SUBSECOND>
   <TIMEZONE>+0000</TIMEZONE>
  </DATETIME>
  <PRODID>618644</PRODID>
  <PRODTYPE>STANDARD</PRODTYPE>
  <DESCRIPTN>XXXXXX</DESCRIPTN>
 </PROCESS_PROD_HDR>
 -<PROCESS_PROD_DETAIL>
 -<PARTNER>
  <NAME index="1">SUPPLIER1</NAME>
```

-continued

```
        <PARTNRID>29438</PARTNRID>
        <PARTNRTYPE>Supplier</PARTNRTYPE>
        <CURRENCY>USD</CURRENCY>
        <DUNSNUMBER />
        <PARTNRIDX>12345678</PARTNRIDX>
        <TAXID>789654321</TAXID>
        </PARTNER>
      - <QUANTITY qualifier="ORDERED">
        <VALUE>1</VALUE>
        <NUMOFDEC />
        <SIGN>+</SIGN>
        <UOM>EA</UOM>
        </QUANTITY>
      - <OPERAMT qualifier="UNIT" type="T">
        <VALUE>7077</VALUE>
        <NUMOFDEC>2</NUMOFDEC>
        <SIGN>+</SIGN>
        <CURRENCY>USD</CURRENCY>
        <UOMVALUE>1</UOMVALUE>
        <UOMNUMDEC>0</UOMNUMDEC>
        <UOM>EA</UOM>
        </OPERAMT>
        </PROCESS_PROD_DETAIL>
        </PROCESS_PROD>
        </DATAAREA>
        </PROCESS_PROD_MAIN>
```

Figure 8:
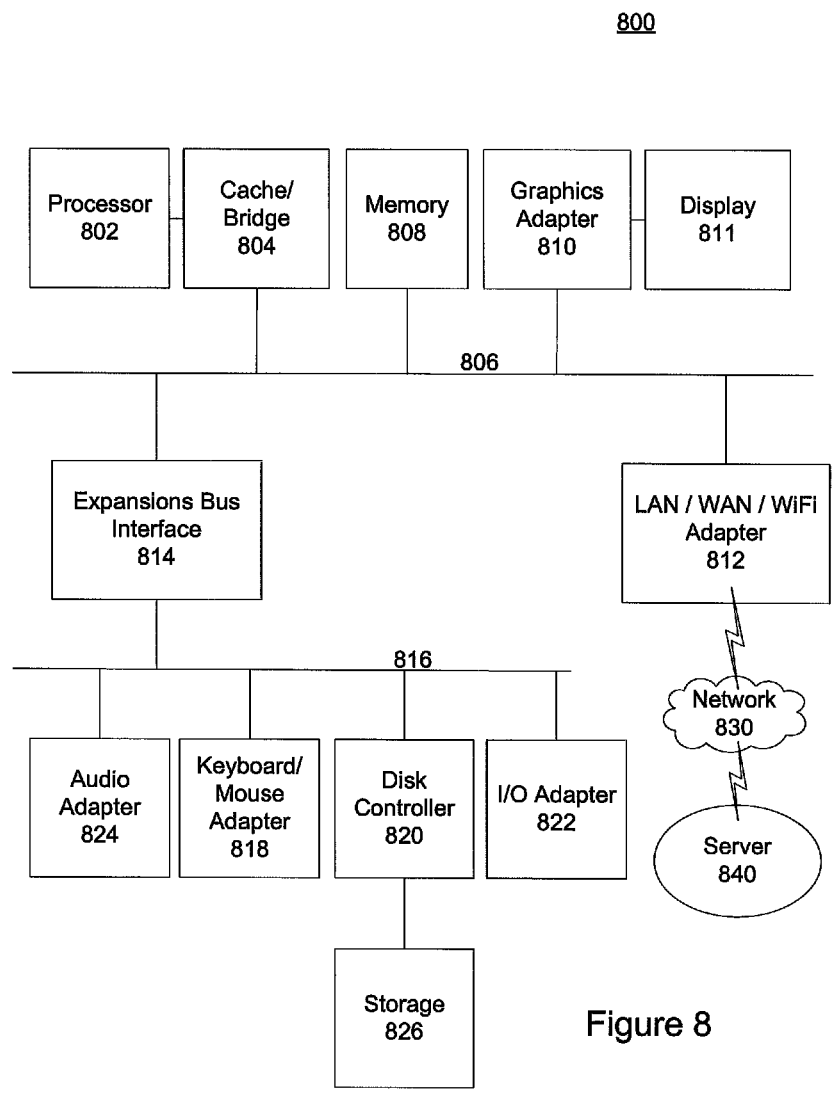
FIG. 8 depicts a block diagram of a data processing system in which an embodiment can be implemented.

FIG. 8 depicts a block diagram of a data processing system in which an embodiment can be implemented as any of the data processing systems described above or depicted in the figures, particularly configured to perform the processes described. The data processing system depicted includes a processor 802 connected to a level two cache/bridge 804, which is connected in turn to a local system bus 806. Local system bus 806 may be, for example, a peripheral component interconnect (PCI) architecture bus. Also connected to local system bus in the depicted example are a main memory 808 and a graphics adapter 810. The graphics adapter 810 may be connected to display 811.

Other peripherals, such as local area network (LAN)/Wide Area Network/Wireless (e.g. WiFi) adapter 812, may also be connected to local system bus 806. Expansion bus interface 814 connects local system bus 806 to input/output (I/O) bus 816. I/O bus 816 is connected to keyboard/mouse adapter 818, disk controller 820, and I/O adapter 822. Disk controller 820 can be connected to a storage 826, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 816 in the example shown is audio adapter 824, to which speakers (not shown) may be connected for playing sounds. Keyboard/mouse adapter 818 provides a connection for a pointing device (not shown), such as a mouse, trackball, trackpointer, etc.

Those of ordinary skill in the art will appreciate that the hardware depicted in FIG. 8 may vary in particular. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 812 can be connected to a network 830 (not a part of data processing system 800), which can be any public or private data processing system network or combination of networks, as known to those of skill in the art, including the Internet. Data processing system 800 can communicate over network 830 with server system 140, which is also not part of data processing system 800, but can be implemented, for example, as a separate data processing system 800.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 800 may conform to any of the various current implementations and practices known in the art.

Some techniques approach EAI (Enterprise Application Integration) with major emphasis on canonical model, data extraction, adapters, transformation for mapping thru XMLs and XSLs and data distribution methods. Various disclosed embodiments use EAI technology for publishing canonical documents, launching universal subscriber and uses data driven integration rules for data transformation and syndication.

Some techniques focus on SQL server data services and are database centric. These techniques consider metadata and use primary/foreign key relationships to perform impact analysis of data services. These techniques use Data Transformation Services (DTS) packages within SQL server and are geared towards operational data. Various disclosed embodiments use similar concept and also produce impact analysis. In various embodiments, data stewardess is maintained and enforced.

Some techniques focus on Enterprise Resource Planning (ERP) and supporting framework; data syndication in these systems is via bulk data transfer and doesn't allow transactional synchronization. Various disclosed embodiments use concepts such as layered approach (e.g., presentation layer, service layer, business layer, data layer) and metadata management. In these embodiments, metadata is used for data synchronization, data stewardship and data governance and the concept can be applied for custom and COTS solution integration.

It is important to note that while the disclosure includes a description in the context of a fully functional system, those skilled in the art will appreciate that at least portions of the mechanism of the present disclosure are capable of being distributed in the form of a instructions contained within a machine usable medium in any of a variety of forms, and that the present disclosure applies equally regardless of the particular type of instruction or signal bearing medium utilized to actually carry out the distribution. Examples of machine usable or machine readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A data processing system comprising:
    a processor;
    a metadata repository storing data that identifies a plurality of target systems;
    a rules repository storing integration rules that identify a data element of interest to each of the target systems and a data distribution format preference for each of the target systems, at least one data distribution format preference for one of the target systems being different than another data distribution format preference for another of the target systems; and
    an integration driver configured to:
        receive an indication that a data element has changed;
        as a result of receiving the indication that the data element has changed, identify, based on the integration rules and data of the metadata repository, first and second interested target systems that corresponds to the changed data element, wherein the first and second interested target systems each have different preferred data distribution formats; and
        as a result of receiving an indication that the data element has changed, cause an interface to publish via a message bus the changed data element to the first and second interested target systems in the preferred data distribution format of each of the interested target systems;
    wherein the target systems comprise subscribers in a publisher-subscriber architecture between the integration driver and the target systems.

2. The data processing system of claim 1, wherein the metadata repository stores a plurality of related tables in a relational database.

3. The data processing system of claim 1, wherein the metadata repository stores data with associated link-IDs.

4. The data processing system of claim 1, wherein the metadata repository and the integration rules each store data with associated link-IDs that can be cross-correlated.

5. The data processing system of claim 1, further comprising a graphical user interface configured to receive queries to the metadata repository.

6. The data processing system of claim 1, wherein the metadata repository and integration rules are stored in a common datastore.

7. The data processing system of claim 1, further comprising a history repository maintaining a history of data processing system transactions.

8. The data processing system of claim 1, further comprising an archive repository storing archive tables corresponding to the metadata repository.

9. The data processing system of claim 1, further comprising a plurality of modules configured to perform Create, Read, Update, and Delete (CRUD) operations on data stored in the metadata repository.

10. A master data management system comprising a plurality of system data processing systems, the system data processing systems configured to together implement:
    a metadata repository storing data that identifies a plurality of target systems; and
    a rules repository storing integration rules that identify a data element of interest to each of the target systems and a data distribution format preference for each of the target systems, at least one data distribution format preference for one of the target systems being different than another data distribution format preference for another of the target systems;
    wherein the master data management system is configured to:
        determine that a data element has changed;
        as a result of determining that the data element has changed, identify, based on the integration rules and data of the metadata repository, first and second interested target systems that corresponds to the changed data element, wherein the first and second interested target systems each have different preferred data distribution formats; and
        as a result of determining that the data element has changed, publish via a message bus the changed data element to the first and second interested target systems in the preferred data distribution format of each of the interested target systems;
    wherein the target systems comprise subscribers in a publisher-subscriber architecture between the master data management system.

11. The master data management system of claim 10, wherein the metadata repository stores a plurality of related tables in a relational database.

12. The master data management system of claim 10, further comprising a publisher module configured to publish transactions performed by the master data management system to a message bus for delivery to at least one of the target systems.

13. The master data management system of claim 10, wherein the master data management system is configure to retrieve metadata tables, retrieve a master transaction and related transactions, and publishes corresponding transactions to a message bus for delivery to at least one of the target systems.

14. The master data management system of claim 10, wherein the master data management system is configured to publish data to a universal subscriber for delivery to the plurality of target systems.

15. The master data management system of claim 10, wherein the metadata repository and integration rules are stored in a common datastore.

16. The master data management system of claim 10, further comprising a history repository maintaining a history of data processing system transactions.

17. The master data management system of claim 10, further comprising an archive repository storing archive tables corresponding to the metadata repository.

18. The master data management system of claim 10, further comprising a plurality of modules configured to perform Create, Read, Update, and Delete (CRUD) operations on data stored in the metadata repository.

\* \* \* \* \*

UNITED STATES PATENT AND TRADEMARK OFFICE
CERTIFICATE OF CORRECTION

PATENT NO. : 8,549,064 B2  
APPLICATION NO. : 12/190484  
DATED : October 1, 2013  
INVENTOR(S) : Chandra H. Kamalakantha et al.

Page 1 of 1

It is certified that error appears in the above-identified patent and that said Letters Patent is hereby corrected as shown below:

In the Claims

In column 16, line 50, in Claim 13, delete "configure" and insert -- configured --, therefor.

Signed and Sealed this  
Seventeenth Day of December, 2013

Margaret A. Focarino  
*Commissioner for Patents of the United States Patent and Trademark Office*